(12) United States Patent
Gai et al.

(10) Patent No.: US 7,880,090 B2
(45) Date of Patent: Feb. 1, 2011

(54) GUIDE ELEMENT FOR THE PASSAGE OF PIPES, CABLES OR THE LIKE THROUGH A WALL

(75) Inventors: Giorgio Gai, Genoa (IT); Andrea Milanese, Genoa (IT)

(73) Assignee: Ultraflex S.p.A., Casella (GE) (IT)

( * ) Notice: Subject to any disclaimer, the term of this patent is extended or adjusted under 35 U.S.C. 154(b) by 145 days.

(21) Appl. No.: 12/352,610

(22) Filed: Jan. 13, 2009

(65) Prior Publication Data

US 2009/0179420 A1   Jul. 16, 2009

(30) Foreign Application Priority Data

Jan. 16, 2008   (IT)   ............................. GE08A0004

(51) Int. Cl.
*H01B 17/58*   (2006.01)
(52) U.S. Cl. ..................................... 174/152 G; 440/76
(58) Field of Classification Search .................... 440/76, 440/77; 174/152 G
See application file for complete search history.

(56) References Cited

U.S. PATENT DOCUMENTS

| 7,500,891 | B2 * | 3/2009 | Yazaki | ......................... 440/76 |
| 7,534,965 | B1 * | 5/2009 | Thompson | .............. 174/153 G |

* cited by examiner

*Primary Examiner*—Stephen Avila
(74) *Attorney, Agent, or Firm*—Themis Law

(57) ABSTRACT

A guide element for passing one or more pipes, cables or the like through a wall includes an interposition element between the one or more pipes and the edge of the passage aperture, and an annular clamping flange on one or both sides of the wall. The flange is substantially concentric with the aperture and it is coupled to the wall along an annular perimetric strip surrounding the aperture. The interposition element is an elastic wedging and/or urging element between one or more pipes and the edge of the aperture, and the ring or flange clamps the interposition element in a wedged and/or urged condition.

35 Claims, 9 Drawing Sheets

GUIDE ELEMENT FOR THE PASSAGE OF PIPES, CABLES OR THE LIKE THROUGH A WALL

FIELD OF THE INVENTION

The present invention relates to a guide element for the passage of one or more tubular elements such as pipes, cables or the like through a wall, more particularly, through a passage aperture made in the wall. The guide element includes an interposition element that is disposed between the tubular elements and the edge of the passage aperture and a fastening annular flange (or ring nut) that is disposed on one or both sides of the wall. The flange or ring nut is concentric in relation to the aperture and is fastened to the wall along an annular perimetric strip surrounding the aperture.

BACKGROUND OF THE INVENTION

Guide elements for the passage of pipes, cables or the like through walls are known. In the marine field such elements are used for passing, and possibly sealingly, ducts or cables through bulkheads, for example, pipes supplying oil within a circuit for controlling a steering cylinder.

Ships steer by means of a pump driven by a wheel, a steering wheel or the like. The pump may have reversible delivery and return, which are connected to opposing inputs of a double-effect cylinder through an oil-pressure circuit composed of a pair of supply pipes. The cylinder body translates along a stationary stem as the wheel is rotated, in one direction or the other, and a depression on one branch and an overpressure on the other branch of the circuit connecting the pump to the cylinder is generated alternatively according to the direction, in which the wheel is rotated. Therefore, ship steering can be controlled by coupling the cylinder directly to the motor or motors for outboard motors, or to the rudder for inboard motors.

Pipes of the supply circuit are configured to withstand pressure and pass from the area of the stern board where the motor or rudder is coupled, toward an intermediate area of the ship where a control station that includes pump and wheel is provided. To achieve such passage, the pipes have to move through one or more bulkheads, which need to remain under watertight conditions if so required. Moreover, since pipes end at the cylinder, which is movable, such sealing effect has to be guaranteed not only as required, in spite of the movement of the pipes, but above all to prevent the pipes from becoming bent and kinked.

In particular, the pipes are dynamically urged by the cylinder moving along the stem in alternating directions, causing the pipes to be compressed or pulled depending on the direction of translation and, therefore, on the steering direction. A bulkhead is a constraint to the movement of the pipes, which may become kinked by being bent due to the stress. Because these types of pipes are typically, made of soft metal materials such as copper, these materials may cause the pipes to become stuck or break if bent without a suitable guide, stopping or reducing the flow of oil and leading to a consequent malfunction of the steering circuit.

In an attempt to overcome this problem, tight fairleads have been introduced, where an elastic guide is placed between the pipe and the opening in the wall being, to which it is attached by a circular concentric flange. These fairleads partially solve the problem caused by the kinking of supply pipes, but also are quite cumbersome and can be used with more than one pipe only by suitably spacing passage openings in the wall. In the specific case of a steering circuit, this requires the installation of the two oil supply pipes to be significantly spaced apart, leading to larger overall dimensions or to a spreading of the pipes near the bulkhead to be traversed, thereby facilitating kinking during installation. There is a need to resolve this problem, because it is often impossible to have steering systems of ships mounted by suitably skilled and attentive personnel. This problem is particularly acute for small ships, such as rubber boats, which are often assembled by the final user using specific do-it-yourself kits.

Moreover, bulkhead feed-throughs in the prior art have fixed diameters corresponding to the diameter of the pipe to be installed. There is often a need to mount pipes having variable diameters, particularly at the end portions, for example for housing an anti-kink sleeve and a pressure-tight fastening terminal coupled to the cylinder. Therefore, peripheral tools often have to be mounted after assembling a bulkhead feed-through, while it would be desirable to assemble a bulkhead feed-through also with partially connected pipes if the opening or openings of the bulkhead allowed a pass-through of such parts of greater overall dimensions.

SUMMARY OF THE INVENTION

It is an object of the present invention is to provide a guide element to facilitate the passage of pipes, cables or the like through a wall, in particular, to provide a simple and reliable bulkhead feedthrough for supply pipes of a steering circuit of a ship.

In one embodiment, the present invention achieves this object by providing a guide element, in which an interposition element shaped like an elastic wedging and/or urging element is disposed between at least two pipes and an edge of an aperture, and in which a ring or a flange clamps the interposition element in the wedged and/or urged condition while allowing the two or more pipes to pass through the wall.

With this arrangement, pipes can be arranged very close one to the other, optimizing spaces and avoiding bending during installation. Moreover, the aperture in the wall or bulkhead may be provided as a single hole for passing both pipes or may include a pair of adjacent openings, for example, having dimensions that do not match the sections of the pipes passing through the wall, thereby providing a greater flexibility during assembly. The pipes are locked in place, in particular, may be sealingly locked by the interposition element, which has a shape matching, on one side, the opening or openings and, on the other side, the diameters of the pipes passing through it. The interposition element has an elasticity such to effectively protect the pipes from kinking while keeping the pipes in a fixed radial and axial position with respect to the bulkhead.

The interposition element has a shape complementary to the shape of the aperture, such to surround at least from the inside the edge of the aperture in its wedged and/or urged condition. In particular, the interposition element may be shaped for fitting on an aperture of the wall typically composed of a pair of adjacent openings or of a single opening.

In one embodiment, the interposition element is made of two parts that can be mutually coupled. A first part has an outer perimetric shape complementary to the shape of the aperture and a second elastic wedging and/or urging part is disposable between the pipe or pipes and the first part of the interposition element. In one embodiment, the first part of the interposition element includes a cup- or glass-like body, hereinafter briefly identified as bell, and a bottom wall of the cup-like part is provided with at least a pair of adjacent openings, through which at least two pipes can pass. The bell has a longitudinal extension, that is, an extension in the axial direction of the pipe or pipes and of the opening or openings, which is typically equal to or greater than the thickness of the wall, and which constitutes a guide/housing cup, at least to a partial extent, for the elastic wedging and/or urging part of the interposition element. Moreover, the bell includes a peripheral edge or an abutment flange matching the wall strip surrounding the opening or openings in the wall when the interposition element is inserted after assembly.

As described above, the bell, that is, the outer cup-like interposition part, typically supports or houses the elastic part of the interposition element, thereby providing a greater sealing effect due to the increased abutment surface with respect to the thickness of the wall.

Each of the two or more openings in the bottom wall of the bell typically has a diameter greater than the section of the corresponding pipe passing through the wall after assembly, thereby allowing parts of greater diameters to pass through it in the disassembled condition, particularly the end of the pipe, and the elastic wedging and/or urging part of the interposition element provides the seal between the pipe/pipes and the bell.

Due to this design configuration, pipes of variable diameters may be introduced through the opening or openings, particularly pipes having larger ends, for example for housing an antikink sleeve and a pressure-tight fastening terminal coupled to the cylinder, leading to an easier assembly. To this end, the opening or openings in the wall should be dimensioned to allow the end of at least one pipe to pass through it.

The elastic wedging and/or urging part of the interposition element is made of two halves, which might be made of rubber, and which, when coupled together, complete each other to define a seal having at least a pair of adjacent openings corresponding to openings of the bell and/or of the wall aperture. Typically, the two halves of the seal have abutment surfaces that are provided with a step in order to increase the abutment surface and provide a better sealing effect.

The seal preferably has a thickness in the axial direction of the openings that is greater than the thickness of the bell, that is, than the depth of the recess defined by the cup shape where the elastic part of the interposition element is housed. Consequently, when the elastic part or seal is wedged and/or urged in the cap or bell, a part of the seal projects axially from the aperture on the face opposite to the bottom wall, allowing the ring or flange to exert an axial compression on the seal, which by radially expanding becomes wedged between the outer wall of the pipe or pipes and the inner wall of the cup-like part, that is, of the cap or bell, thus providing the sealing effect.

To this end, the ring or flange has two or more adjacent openings that coincide with openings on the bottom wall of the bell and/or on the wall aperture. The perimetric edge of these openings abuts against the elastic wedging and/or urging part of the interposition element.

More particularly, the openings in the ring or flange have a diameter greater than the section of the corresponding pipe passing through the wall in the assembled condition, thereby allowing the through passage, in the disassembled condition, of parts having greater diameters, for example, the ends of the pipes, while the elastic wedging and/or urging part of the interposition element acts as a seal between the pipe/pipes and the ring or flange.

The ring or flange typically has openings for fastening to the wall by means of screws, which typically are arranged symmetrically about the axis of the ring or flange and which provide an effective clamping.

An annular seal is typically provided between the ring or flange and the wall, which prevents humidity from passing below the flange, and, therefore, through the wall. Fastening is preferably provided with screws inserted into openings disposed on ends of the flange, typically symmetrically about the axis of the flange, providing for a cross-fastening. Rings or flanges can also be arranged on both of the opposite sides of the wall and provide for greater sealing and more effective clamping.

In one embodiment, the wall is a bulkhead of a ship and the pipes are pipes supplying oil within a circuit for driving a steering cylinder.

Another aspect the invention relates to a ship having a steering system, which includes a pump with reversible delivery and return and which is driven by a wheel and is connected to a double-effect cylinder by means of a pair of supply pipes. The guide element is configured according to the invention and allows sealing passage through a bulkhead, particularly the bulkhead provided between the stern board, where the motor or motors is or are provided, and the intermediate area of the ship, where the control unit is provided.

Still another aspect the invention relates to a method for allowing two or more pipes or the like to sealingly pass a wall, particularly a bulkhead of a ship. In one embodiment, such pipes are two supply pipes of the steering circuit of a ship and provide a guide element according to the invention. Such method includes the following steps:

providing an aperture in the wall dimensioned to allow the passage of two or more pipes;

inserting the pipes into the aperture;

inserting on one side of the wall a bell and a clamping annular flange with a seal before connecting the pipes to user devices;

connecting ends of pipes to the user devices or anyhow defining a correct position for the pipes;

positioning the bell into the aperture of the wall such to surround it;

mounting a seal divided in two complementary parts and having a shape that can be wedged and/or urged between the pipes and bell; and clamping the flange on the wall, urging the seal into the bell.

It should be noted that locking a pipe by elastic means and possibly providing a sealing effect at the same time requires the application of individual elements, namely, the interposition element and the clamping ring, only on one side of the wall or bulkhead. This enables the passage of watertight peaks without inspection entrances.

Another advantage of the invention is that locking action of the pipe or pipes and the sealing effect is performed by the elastic wedging part, i.e. the elastic wedging seal, at only one side of the wall or bulkhead between the cup-like part (also identified as cap or bell) and the pipes, while the sealing effect between the interposition element and the wall is achieved by a seal placed between the wall or bulkhead and the ring, and/or between the interposition element, i.e. the peripheral flange of the cup-like part and the wall strip surrounding the opening provided in the bulkhead. This seal is clamped to provide a seal between the ring and the wall and/or between the interposition element and the wall when the ring is clamped against the interposition element and against the wall.

One of the advantages of the invention is that one or more pipes are sealingly locked to provide protection against warping, kinking and possibly rupture with mass produced structural parts and at the same time with a precision of shape and size that optimally adjusts the locking force and elasticity exerted on the one or more pipe or pipes. The interposition element, in particular, only the rigid cup-like part, is simply fastened to the bulkhead, without causing additional stresses between the interposition element and pipes. At the same time, the opening in the bulkhead need not be dimensioned with the greatest precision, therefore, dimensional tolerances of the aperture in the bulkhead can be kept relatively high while providing full functionality of the element locking the one or more pipes reducing concerns about the quality level of the aperture in the bulkhead and the ability and possible errors of the person handling installation. Therefore, the present invention eliminates variables related to the manual ability of the installing technician and high repeatability of the installation procedure.

In an embodiment of the invention, the elastic wedging part of the interposition element is provided as a pair of bushings made of an elastic material, each coinciding and coaxial with one of the two openings provided in the cup-like part and each one having an axial extension slightly greater than the depth of the corresponding recess of the cup-like part. Further, each one of these bushings is provided with a coaxial narrowing portion at an intermediate area of the axial extension. This narrowing portion has is shorter than the entire axial extension of the bushing and it is connected by a conical flare to the inner cylindrical surface of the bushing.

In an embodiment of the invention, a crown of one or more axial recesses is provided at least at the end side of the elastic wedging part that is faced toward the direction of introduction into the cup-like part. These axial recesses extend for at least a portion of the total axial length of the elastic wedging part and are provided within the radial thickness of the wall surrounding each of the openings housing a pipe. This arrangement enables a saving in materials but also an adjustment of the elastic behavior of the wedging part in the direction of radial compression through the locking element.

In an embodiment of the invention, the cup-like part of the interposition element includes a perimetric flange overlapping or abutting against the wall strip surrounding the passage opening in the bulkhead, and an interposition seal between such flange and wall strip. The seal may become sealingly and automatically clamped at the same time as when the ring or fastening flange is clamped against the interposition element.

In an embodiment of the invention, the elastic wedging part includes an axial projecting part shaped like a pair of elastic projection sleeves on the side opposite to the bottom wall of the cup-like part. Such sleeves extend from the wedging element and are disposed side by side coaxially with one of the openings of the elastic wedging part and one of the openings in the bottom wall of the bell. Said projection sleeves overlap, for a certain axial length, the portion of a corresponding pipe locked into the interposition element.

In an embodiment of the invention, the two projection sleeves are separate and have a perimetric shell wall that is knurled or with rims.

The overall thickness of the shell wall of said projection sleeves may be substantially uniform, while the radial extension of rims is greatest at the end opposite to the bulkhead, narrowing to basically zero toward the portion of the wedging element housed in the cup-like part. In particularly, the outer diameter of the projection sleeves may be uniform and the thickness of the sleeve walls may narrow progressively starting from the end connected to the elastic wedging element toward the opposite end.

This arrangement causes the sleeves to become increasingly flexible during bending as the distance from the bulkhead increases.

In an embodiment of the invention, each of the projection sleeves is housed into an outer tubular shell having an inner diameter that substantially corresponds to the outer diameter of the sleeve and further having an end flange that abuts against the elastic wedging part. The ring or clamping flange is overlapped on said flange, causing the ring or clamping flange to be clamped against the bulkhead and against the interposition part and the tubular shells to be locked contemporaneously between the ring and the interposition element, in particular, the elastic wedging part of the interposition element.

In this embodiment, the outer diameters of tubular shells are dimensioned to allow these shells to extend through openings for the pipes in the ring or clamping flange, while flanges of these shells only abut under the wall where these openings are provided. In this embodiment, these tubular shells are configured as tube stubs having a perimetric flange, which may be continuous or discontinuous.

The projection sleeves of the elastic wedging element may be produced from an elastic material and may be of the same material of the wedging part, while the shells may also be made of an elastic material, but preferably such material is less flexible or more rigid than the material of the projection sleeves.

The above described embodiment, and particularly the combination of projection sleeves of the elastic wedging element and tubular shells overlapping thereto, provides for a particularly advantageous functionality of the device.

When, during operation of an actuator, the portion of the pipe situated between the actuator and the bulkhead, i.e. between the actuator and the locking element of the pipe, is subjected to a bending stress, the projection sleeves that are housed into the shells and overlapped to the end portion of the pipe at the area, where the pipe is locked in the bulkhead, that is, at the pipe portion coinciding with the wall to be traversed, prevent the pipe from excessive bending in that portion, and accordingly from kinking or inelastical deformation. When the rims of the projection sleeves have a variable radius increasing from the end adjacent to the elastic wedging part toward the opposite end, and the sleeves have uniform outer diameters, then each sleeve can be elastically moved inside the corresponding shell, allowing the pipe portion within the projection sleeve to bend in a controlled and progressive manner. The shell has a greater elasticity and allows the pipe also to be bent due to the greater stresses to which it is subjected, but at the same time limits the possible radius of curvature to such degree that kinking or inelastic deformations are prevented.

The combination of outer shell and projection sleeve is also an effective system for cushioning/damping vibrations.

It should be noted that like the elastic wedging part, the projection sleeves also may be made of two halves according to the same transverse separation plane of the elastic wedging part, that is, the plane that includes the axes of the adjacent openings of the elastic wedging part and the coinciding axes of the projection sleeves. Therefore, the assembly of elastic wedging part and projection sleeves is composed of two halves, each one integrally having one half of the elastic wedging part, and two semicylindrical projection parts placed side by side, each constituting one half of the projection sleeves.

The projection sleeves with the elastic wedging part may be composed of two half-shells, separated one from the other according to a diametrical separation plane, while corresponding outer shells may be composed of one-piece tubular elements locking the two halfshells forming the corresponding sleeve in a coupling position.

When the elastic wedging parts and relative projection sleeves are integrated into a single element made of two halfshells, which are separated along a same diametrical separation plane as the projection sleeves and the corresponding wedging parts, the shells may be provided separated one from the other and individually inserted on the projection sleeves, or may be integrated into a single part comprising a number of tubular shells corresponding to the number of projection sleeves, which may can be inserted together on the projection sleeves.

In an embodiment of the invention, the inner diameters of the projection sleeves and of the corresponding wedging parts substantially correspond to the outer diameters of the pipe portions intended to be housed inside the projection sleeves and corresponding wedging parts, and are slightly smaller than the outer diameters of the pipe terminals. Instead, the outer diameters of the projection sleeves and the inner diameters of the shells are substantially the same and are larger than the outer diameters of the pipes disposed between the part or parts housed in the projection sleeves and pipe terminals at the corresponding pipe ends.

Based on the foregoing, end portions of the pipes to be engaged into the wedging parts and into the projection sleeves contact the outer surfaces of the pipes due to the half-shells of the wedging parts and projection sleeves, and lock the half-shells one to the other by means of shells that may be inserted onto pipes having larger inner diameters than the diameters of clamping terminals of the pipe or pipes.

BRIEF DESCRIPTION OF THE DRAWINGS

The drawings constitute a part of this specification and include exemplary embodiments of the invention, which may be embodied in various forms. It is to be understood that in some instances various aspects of the invention may be shown exaggerated or enlarged to facilitate an understanding of the invention.

FIG. 2 shows front and rear perspective views of the element of FIG. 1 mounted on a wall with a pair of pipes passing through.

DETAILED DESCRIPTION OF EMBODIMENTS OF THE INVENTION

Detailed descriptions of embodiments of the invention are provided herein. It should be understood, however, that the present invention may be embodied in various forms. Therefore, the specific details disclosed herein are not to be interpreted as limiting, but rather as a representative basis for teaching one skilled in the art how to employ the present invention in virtually any detailed system, structure, or manner.

Figure 1:
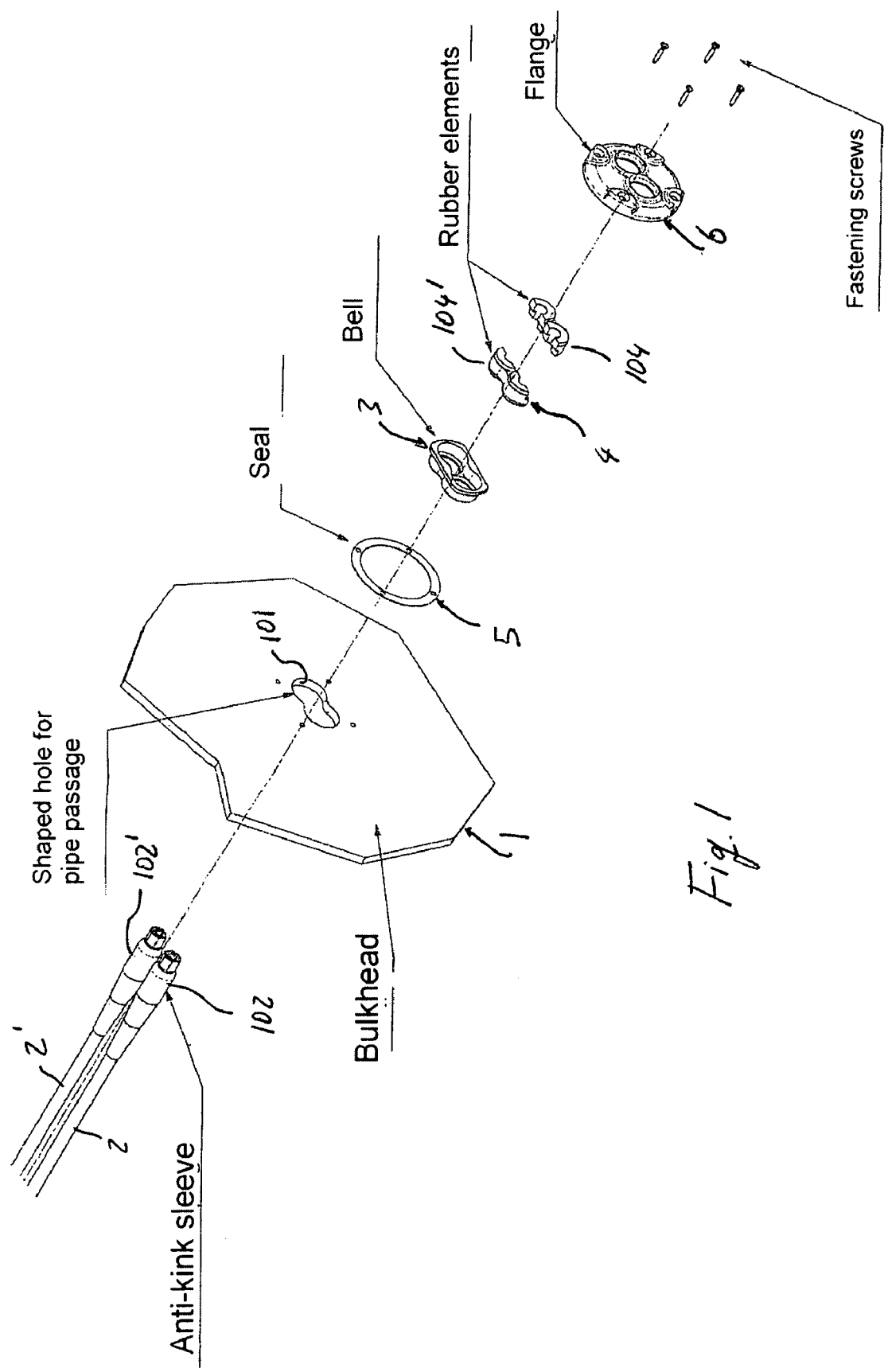
FIG. 1 shows an exploded view of a guide element according to an embodiment of the invention.

With reference to FIG. 1, wall 1 is a ship bulkhead and pipes 2, 2' are pipes supplying the steering hydraulic circuit that connects the double-delivery pump, driven by the ship wheel, to the steering cylinder connected to the motor or motors. Bulkhead 1, for example, may be the wall by the motors that separates the stern board and the remaining part of the ship, but may also be any ship wall requiring to be sealingly traversed by pipes or cables. Moreover, while the following description relates to pipes 2, 2', the present invention is equally applicable to other types of tubular elements, such as cables or the like.

Pipes 2, 2', at the ends intended to be fitted on the steering cylinder, include anti-kink sleeves 102, 102' having cross-sections respectively larger than the diameters of pipes 2, 2'. Bulkhead 1 includes a pair of partially overlapping openings 101 forming a binoculars-like aperture. Alternatively, these openings may be also completely separated or tangent at one point, such to form two apertures each intended to receive a pipe, or may be a single larger opening dimensioned to allow the two pipes to traverse it. In such a case, if pipes 2, 2' are serially inserted through the aperture, the diameter of the opening may be such to allow an end 102, 102' of at least one of pipes 2, 2' to pass through.

Figure 3:
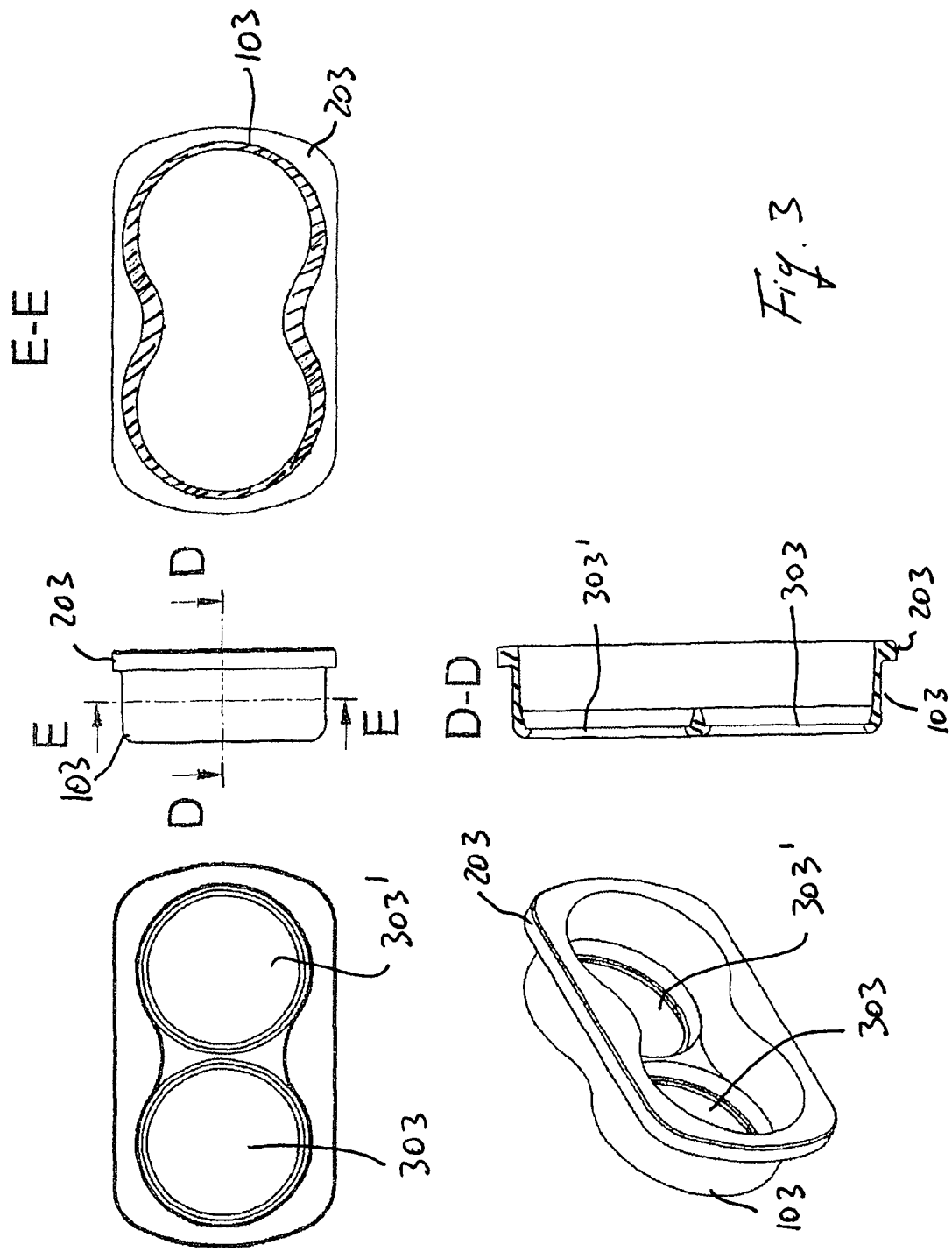
FIG. 3 shows different views of a bell of the guide element according to the embodiment of FIG. 1.

Seal 4, typically made of rubber, is placed between hole/holes 101 of bulkhead 1 and pipes 2, 2' by means of bell 3, blocking pipes 2, 2' in position, for example, by interference fit. As shown in FIG. 3, bell 3 is a hollow element having a bottom wall with a pair of openings 303, 303' of a diameter dimensioned to allow pipes 2, 2' and, more particularly, anti-kink sleeves 102, 102' to pass through. Bell 3 is laterally delimited by a wall 103 whose outer configuration follows the shape of the opening or openings 101 of bulkhead 1 and includes a matching annular edge or flange 203 that, once bell 3 is assembled, abuts or overlaps bulkhead 1. In order to limit the overall dimensions, openings 303, 303' are very close to each other and may be tangent to each other. Openings 303, 303' may also be spaced at a greater distance, for example to provide for an easier assembly or to be fit with previously assembled pipe kits, thus avoiding bends that can lead to kinking of the pipes.

Bell 3 is configured to provide a housing for elastic urging element or seal 4 and to be fit within opening 101 in bulkhead 1, independently of the distance between pipes 2, 2' passing through it. For example, bell 3 may have a substantially circular outer configuration to provide bulkhead 1 with a single opening, thus simplifying assembly.

The sealing effect between bell 3 and the portion of bulkhead 1 delimiting the opening or openings 101 is provided by seal 5, which is placed between clamping flange 6 (identified herein to identify also a locking ring or ring nut) 6 and bulkhead 1, while the sealing effect between openings 303, 303' of bell 3 and pipes 2, 2' is provided by seal 4.

Figure 4:
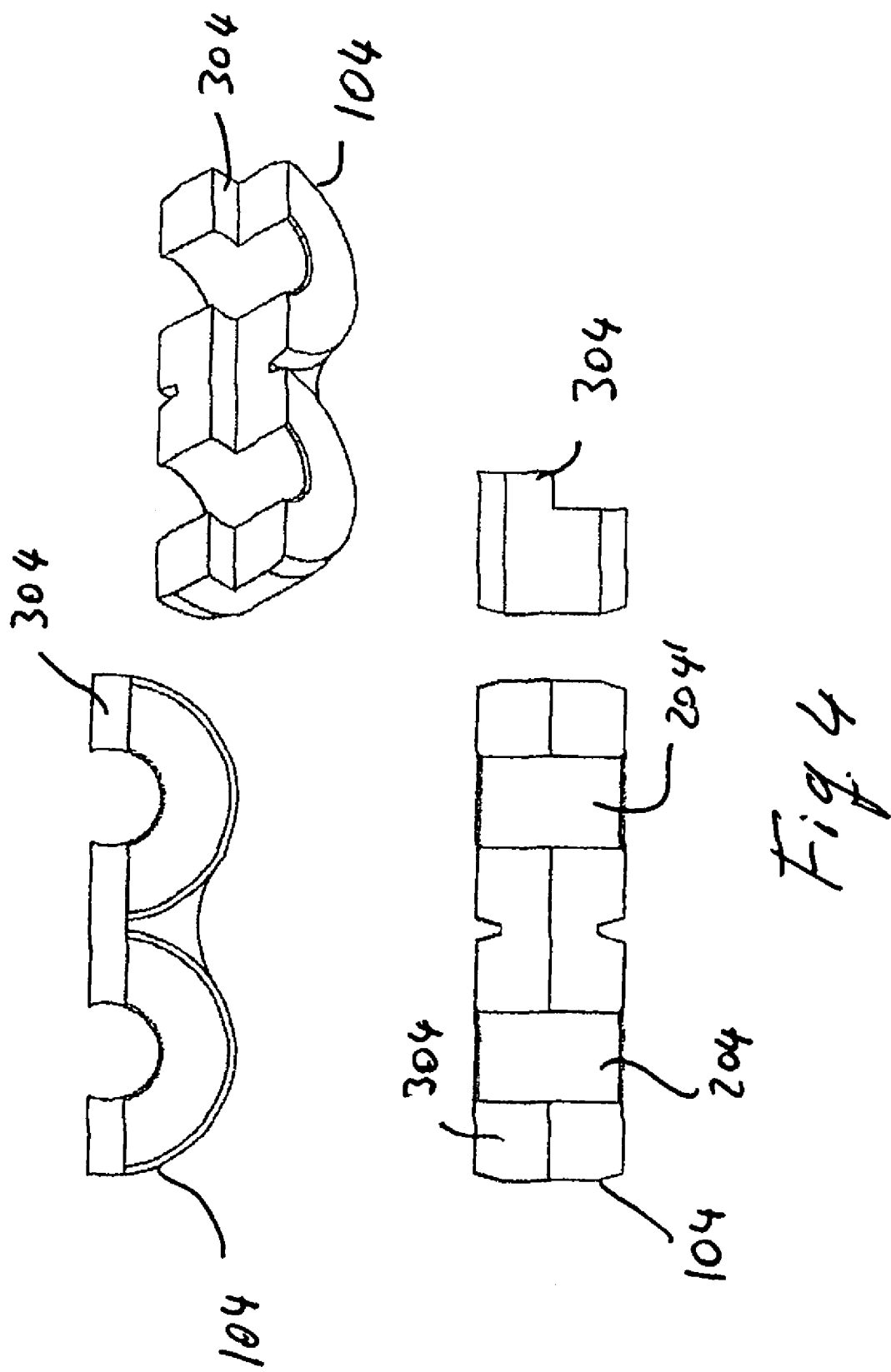
FIG. 4 shows different views of one of the two halves of a rubber element fitted between a pipe and the bell according to the embodiment of FIG. 1.
Figure 5:
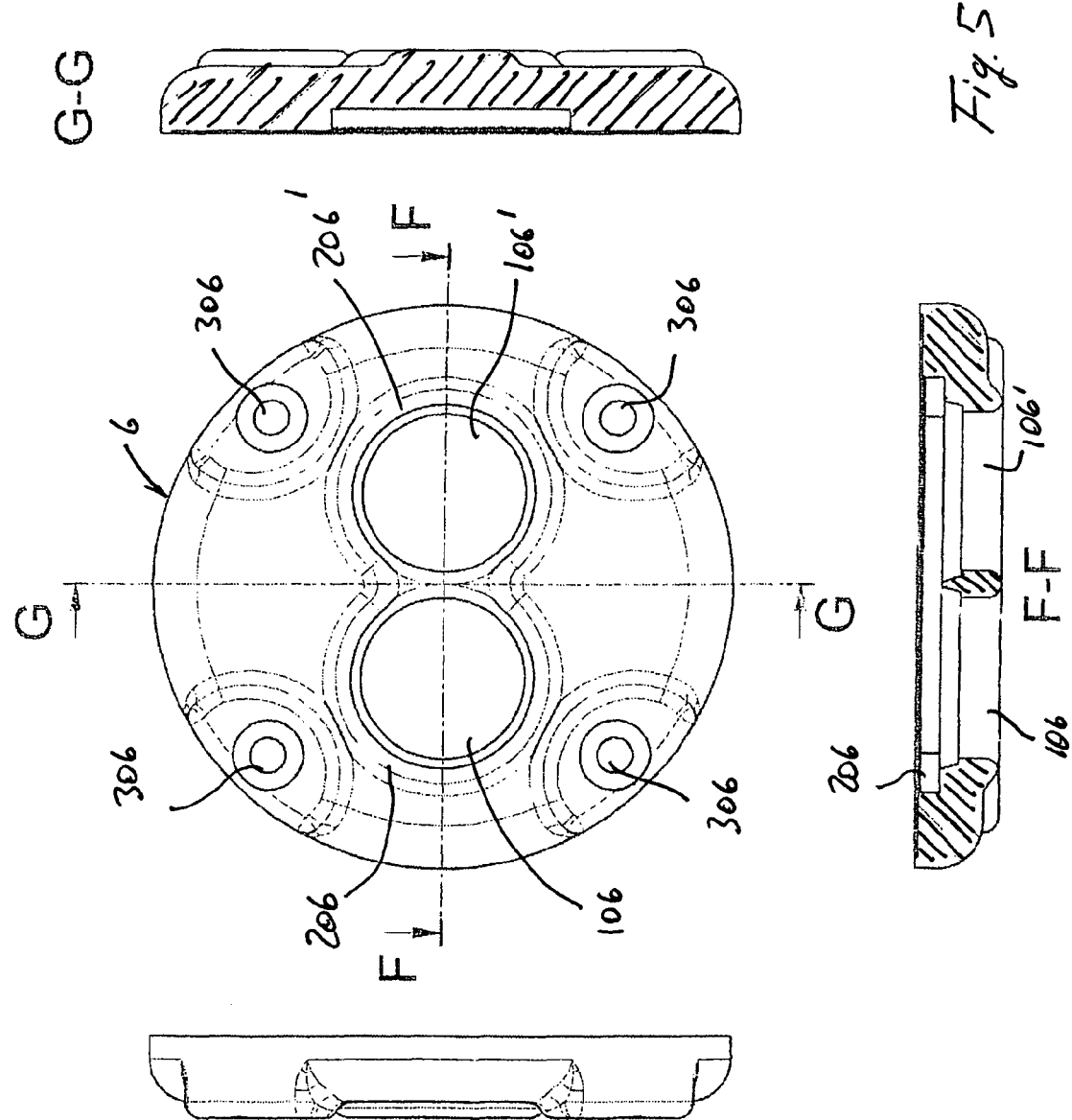
FIG. 5 shows different views of the flange of the guide element according to the embodiment of FIG. 1.

With reference to FIGS. 3 and 4, seal 4 includes a pair of rubber elements 104, 104' that are complementary in the assembled condition, forming a wedging and/or forcing element between bell 3 and pipes 2, 2'. The shape of seal 4 is complementary to the hollow portion of bell 3 and it includes a pair of eyelets 204, 204' at openings 303, 303' of bell 3. In order to increase the abutment surface, and accordingly to improve the sealing effect, the two elements 104, 104' have a longitudinal step 304, 304'.

Figure 2:
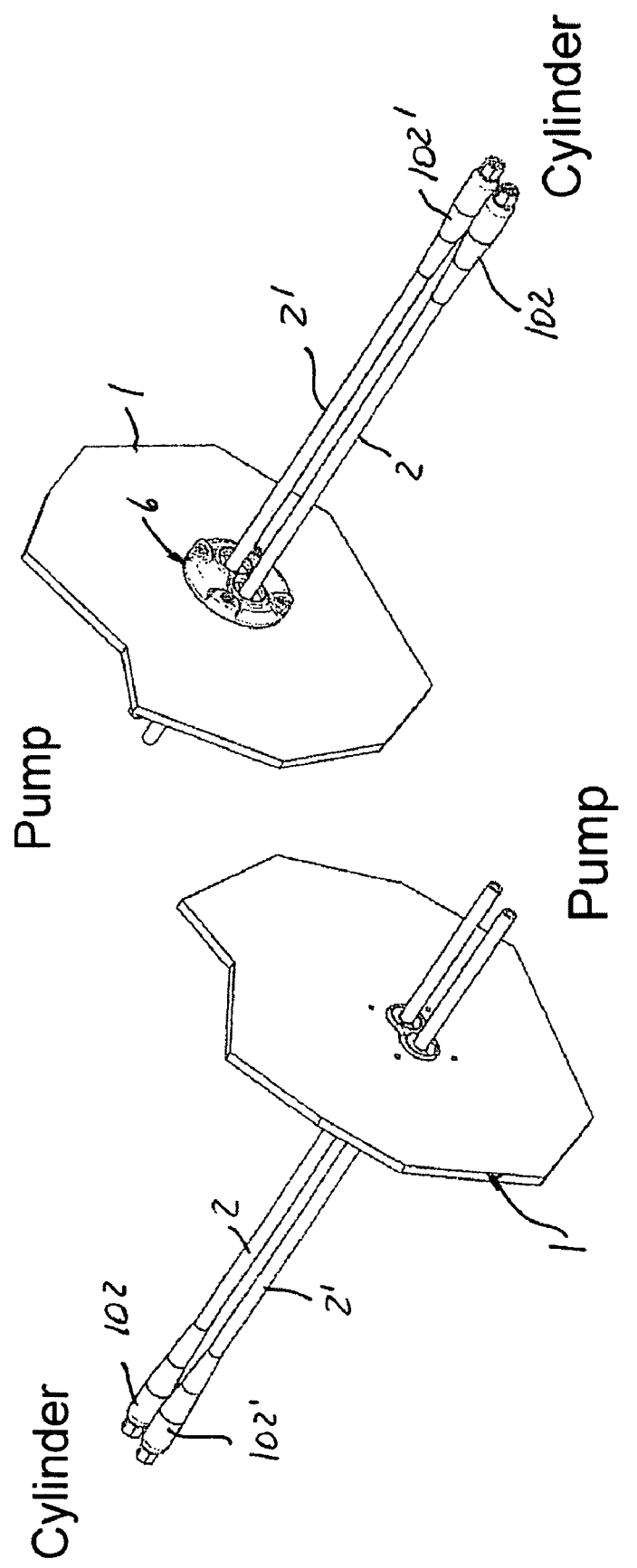
Figure 6:
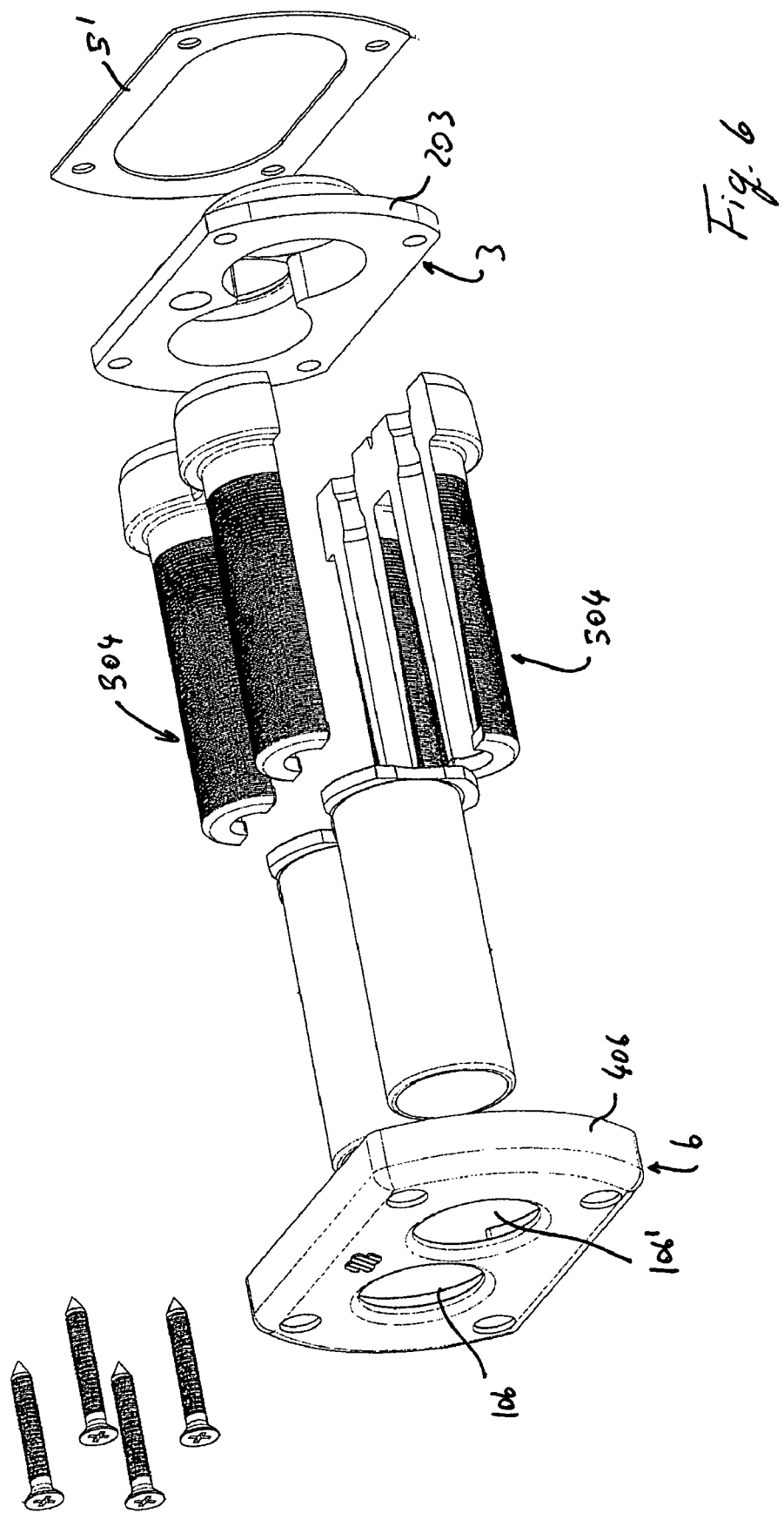
FIG. 6 shows an exploded view of a guide element according to another embodiment of the invention, in which the interposition element for locking pipes in the bulkhead has two axial projecting parts overlapping pipe end portions at the passage through the bulkhead.

With reference now to FIGS. 1, 2 and 6, outer flange 6 includes a pair of openings 106, 106' corresponding to openings 303, 303' of bell 3 and substantially of the same diameter. Openings 106, 106' have a perimetric annular groove 206, 206' adapted to house seal 4 when in the abutting condition. Flange 6 has four apertures 306 disposed in cross-wise pattern near its outer edge, providing for an effective coupling with bulkhead 1 by means of screws 7.

The above described guide element may be assembled, for example, as follows:

an opening 101 shaped for the passage of pipes 2, 2' is arranged on bulkhead 1. Opening 101 is a binoculars-like opening (intersection of two circles) in the embodiment depicted in FIG. 1, but also can have a circular shape or any other shape;

two hydraulic pipes 2, 2' are passed through shaped opening 101, together with fittings and anti-kink sleeves 102, 102', which are already connected to the steering pump according to a method known in the art;

pipes 2, 2' are then passed through bell 3, the outer shape of which matches the shape obtained in bulkhead 1 (in the illustrated embodiment, the binoculars-like shape). Bell 3 is then inserted in opening 101 and its outer edge abuts against bulkhead 1;

pipes 2, 2' are made to project from bulkhead 1 for the desired length;

in the gap between pipes 2, 2' and bell 3, rubber elements 104, 104' are inserted, which are suitably shaped to prevent water from entering into bulkhead 1, and are slightly forced in during insertion;

seal 5 is placed between flange 6 and bulkhead 1 to provide for a sealed system;

flange 6 is fastened to bulkhead 1 with four screws 7, such that the flange 6 compresses rubber elements 104, 104' and prevents pipes 2, 2' from moving axially.

Rubber seal 4 not only provides a sealing effect, but also reduces the inclination of pipes 2, 2' to bend and "click" at the wall. This is an important aspect with regard to safety of the ship, since a "clicked" pipe can cause the ship to lose control.

A person skilled in the art will appreciate that the invention is not limited to the above described embodiment, but can be widely varied, including from a structural standpoint, without departing from the spirit and scope of the invention.

For example, FIGS. 6 to 13 illustrate another embodiment of the invention.

According to this second embodiment, the cup-like part or bell 3 of the interposing element has a perimetric flange 203 overlapping the wall portion surrounding opening 101 through bulkhead 1 and a seal 5' interposed between flange 203 and the above mentioned wall strip. Seal 5' is clamped in the sealing condition against the part assembly forming the interposing element, while the ring nut or fastening flange 6 provides the locking element.

Figure 8:
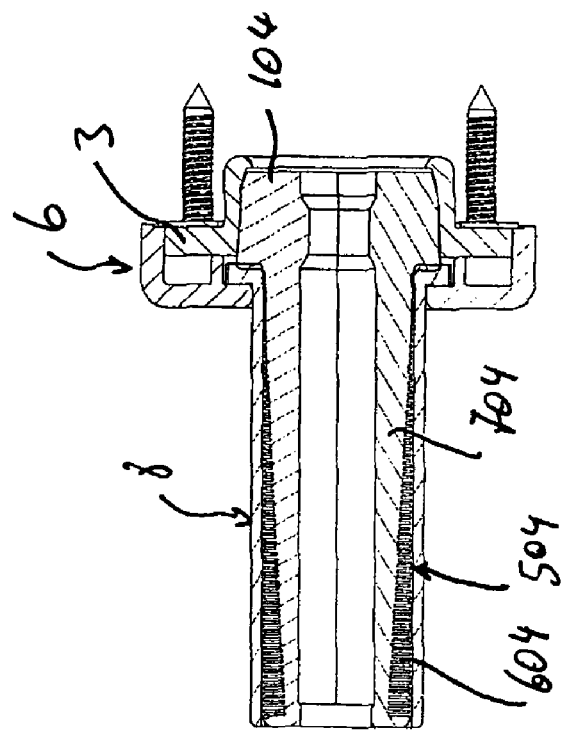
FIG. 8 shows a cross-sectional view of the guide element of FIGS. 6 and 7 taken along a diametrical plane perpendicular to the common section diametrical plane of the two projection sleeves that contains the axes of the two projection sleeves.
Figure 7:
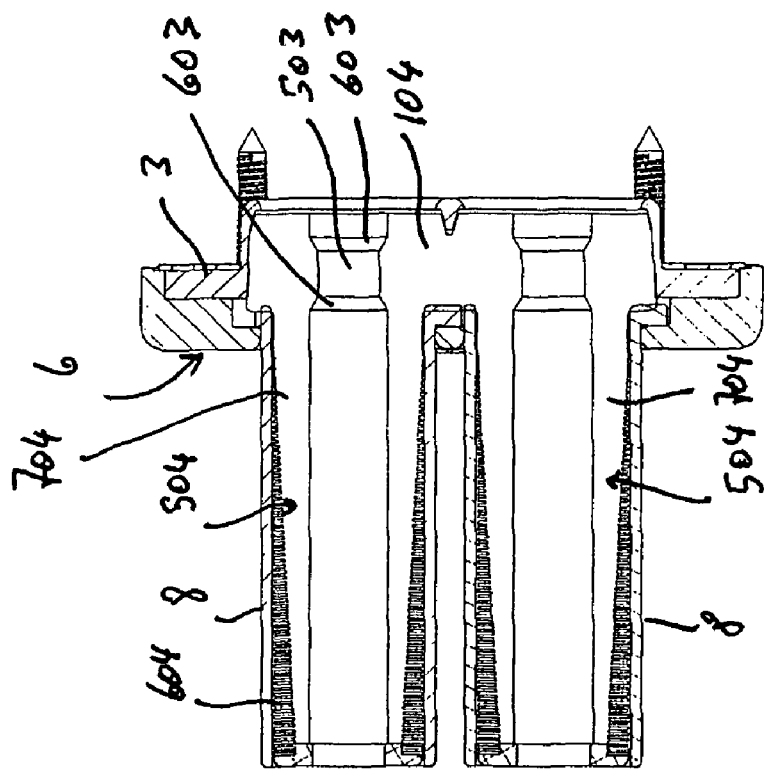
FIG. 7 shows a cross-sectional view of the guide element according to FIG. 6 when mounted on a bulkhead. The cross-section is taken along a common diametrical plane of two projection sleeves that contains the central axes of the projection sleeves.
Figure 9:
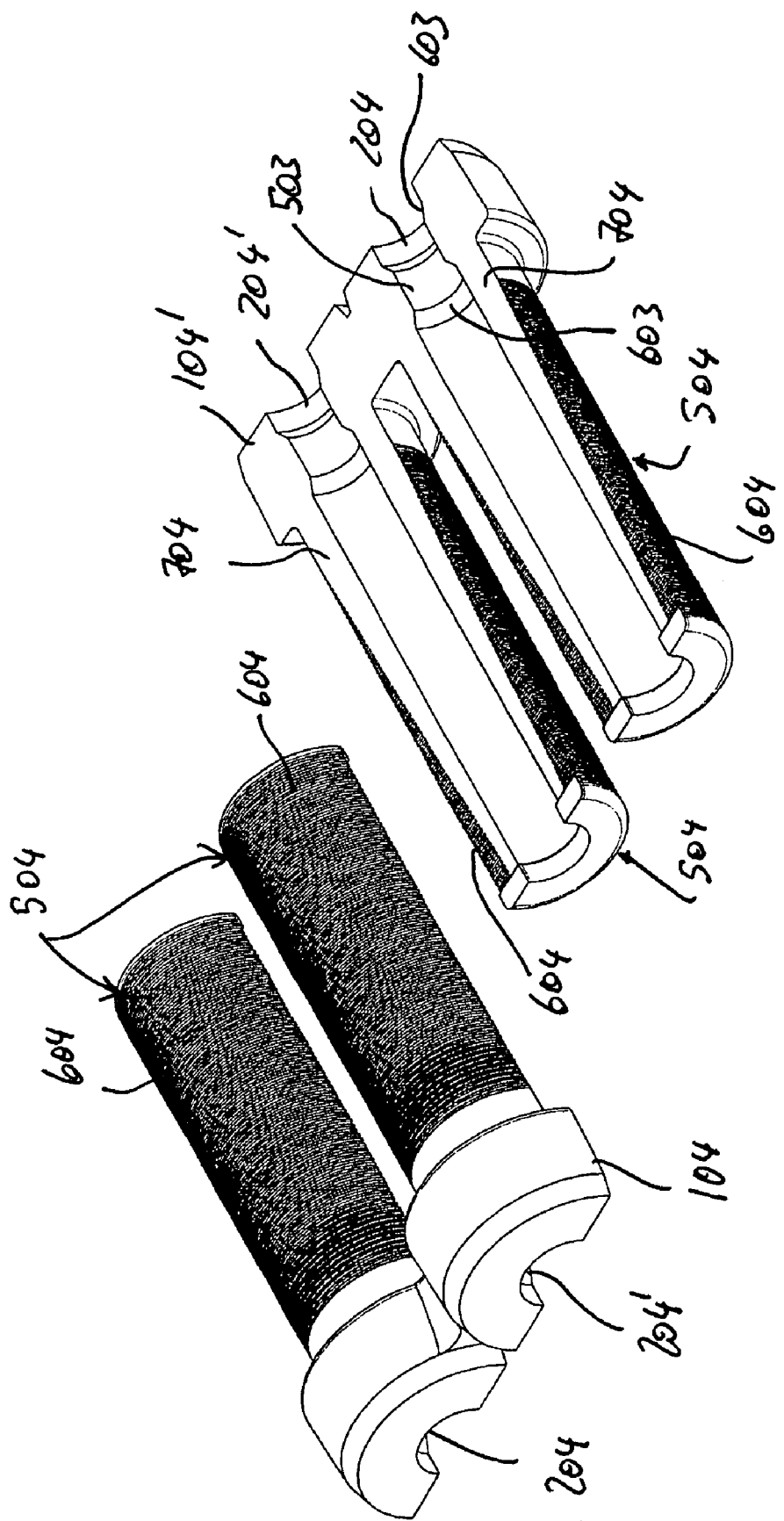
FIG. 9 shows a perspective view of one embodiment of the invention, in which projection sleeves are made of two half shells separated one with respect to the other according to a plane that contains the axes of the projection sleeves.
Figure 10:
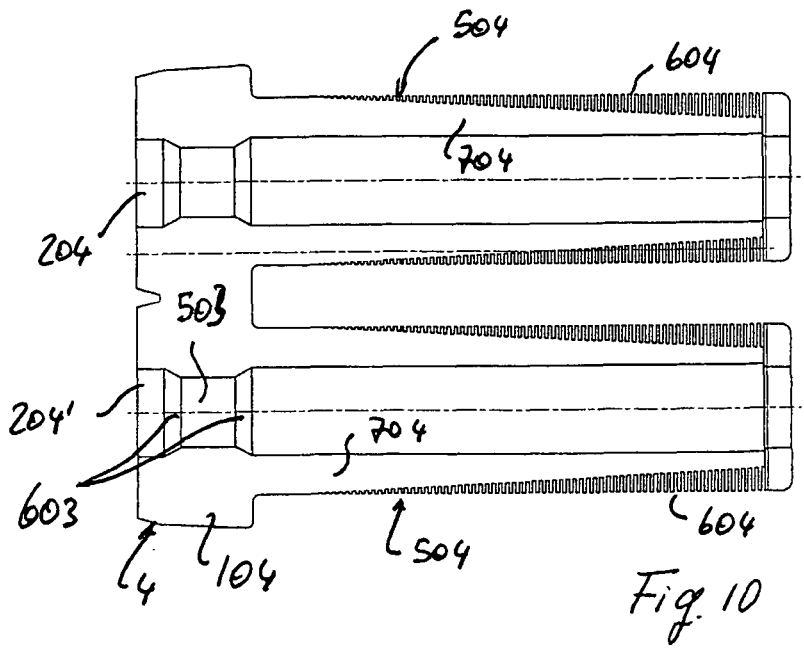
FIG. 10 shows a top plan view of one of the half shell of FIG. 9.
Figure 11:
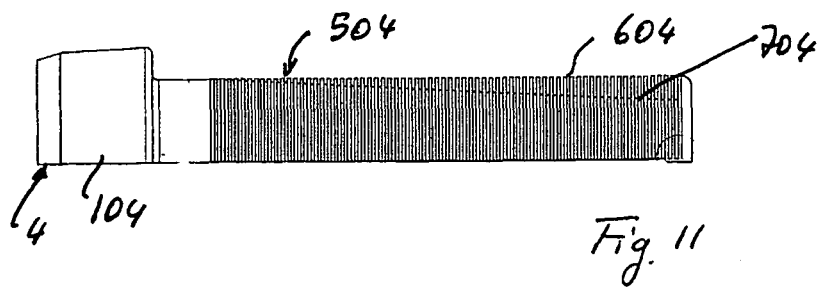
FIG. 11 shows a side view of one of the half shells of FIGS. 9 and 10.
Figure 13:
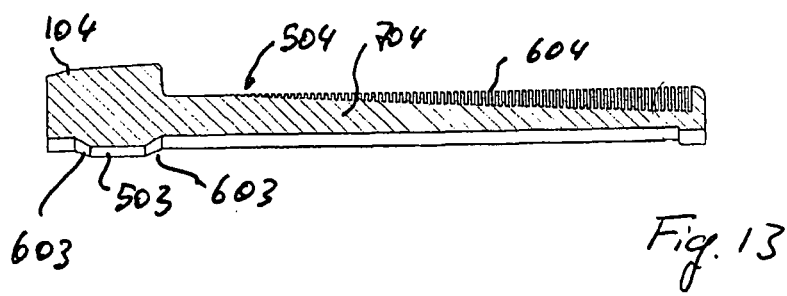
FIG. 13 shows a cross-sectional view according to a diametrical plane perpendicular to the separation plane of the two half shells shown in preceding figures and is provided to illustrate an embodiment, in which rims have a progressively increasing length toward one of the ends of the projection sleeves.
Figure 12:
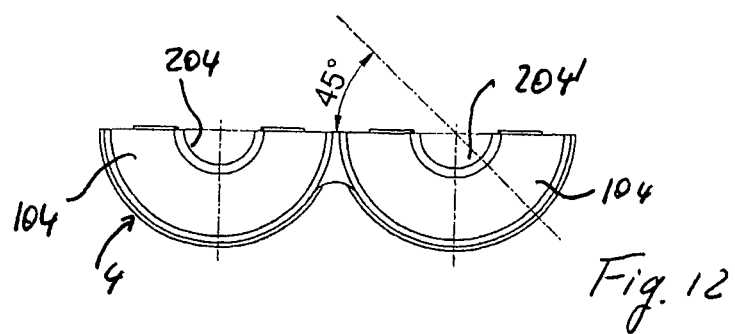
FIG. 12 shows a view on one of the two ends of the half shell of FIGS. 9 to 11.

In particular, FIGS. 6, 7 and 8 show the present embodiment as having cup-like part 3 with a recess therein, similarly to the embodiment depicted in FIGS. 1-5, and more specifically in FIG. 3. The outer flange 203 has a greater size and a substantially rectangular shape with the shortest sides, that is, the sides oriented laterally having curved shapes, for example, bent outwardly Locking element 6 has a shape corresponding to the shape of flange 203 of cup-like part 3 and includes a plate overlapping cup-like part 3 and having a shape corresponding to the shape of flange 203. Locking element 6 also has a perimetric rim 406 overlapping the outer lateral edge of the flange 203.

The plate of locking element 6 includes two adjacent through slots 106, 106' arranged to coincide and be coaxial with apertures 303, 303' of the cup-like part 3 when the locking element 6 is mounted upon cup-like part 3. Moreover, locking element 6 and flange 203 of cup-like part 3 have coinciding holes 306 for the passage of screws 307 for tightening and fastening to the wall of the bulkhead 1.

With further reference to FIGS. 6 to 13, the elastic wedging part on the side opposite to the outer wall of cup-like part or bell 3 has an axial projection shaped like a pair of elastic, projection sleeves 504. Sleeves 504 extend from wedging element 4 and are placed side by side. Each one of projection sleeves 504 is coaxial with respect to one of the openings 204, 204" of the elastic wedging part 4 as well as with respect to one of the openings 303, 303' of bell 3. Projection sleeves 503 overlap, for a certain axial length, pipes 102, 102' locked inside the interposition element.

Projection sleeves 503 may be separated and have a perimetric shell wall knurled or with rims.

As shown in FIGS. 7, 8, 9, 10 and 13, the total thickness of the shell wall of projection sleeves 504 may be substantially uniform. Instead, the radial extension of rims 604 is greatest at the end of projection sleeves 504 opposite to bulkhead 1 and it progressively narrows down to zero or near zero towards the part of the wedging element 4 housed inside cup-like part or bell 3.

Preferably, the radial extension of rims 604 is reduced and the thickness of solid part 704 of the shell wall is correspondingly increased linearly. In practice, as shown in FIGS. 7, 8, 9, 10 and 13, solid part 704 of the shell wall has a conical shape and rims 604 extend from the conical surface radially and outwardly. Rims 604 have an annular shape and an inner diameter changing according to the axial position along sleeve 504, but the outer diameter remains the same for all rims 604, therefore, each sleeve 504 defines an ideal enveloping surface having a substantially cylindrical shape.

Therefore, in one embodiment of the invention, the outer diameter of projection sleeves 504 is uniform, and the partial thickness of shell wall 704 of sleeves 504 has a continuous or solid section that becomes progressively narrower from the outer end toward the inner end.

It should be noted that projection sleeves 504 and the elastic wedging part 4 can be manufactured by injection molding, making their manufacturing costs are very attractive.

The above described embodiment provides for projection sleeves 504 that are flexible with regard to, with a flexible portion that progressively increases as the distance from bulkhead 1 increases. The flexibility of sleeves 504, defined as the ability to bending transversally to the longitudinal axis thereof, increases as the distance from bulkhead 1 increases. Therefore, a pipe housed inside a sleeve 504 and clamped into the interposition part provided at the end of the sleeve 504 adjacent to bulkhead 1 is retained and supported more firmly against a possible bending and, accordingly, against kinking in the area closest to bulkhead 1. Because sleeves 504 are more rigid in the portion oriented toward bulkhead 1, the risk of bending the pipe and consequently of kinking it in the portion adjacent to the bulkhead and to the wedging portion wherein it is clamped is significantly reduced. Instead, the pipe can be deformed to a greater extent as its distance from bulkhead 1 becomes greater due to the greater flexibility and pliability of sleeve 504.

In another embodiment of the invention, projection sleeves 504 are housed each one into an outer tubular shell 8. In this embodiment, a tubular shell 8, for example a cylindrical shell may be provided for each projection sleeve 504. The inner diameter of tubular shell 8 substantially corresponds to the outer diameter of projection sleeve 504, and the outer diameter of tubular shell 8 substantially corresponds to or is slightly lower than the diameter of openings or slots 106, 106' in the locking element 6. Advantageously, the cross section of projection sleeves 504 may be circular, as well as the cross section of tubular shells 6 and the shape of slots or openings 106, 106' of locking element 6. At one end, tubular shells 8 have an end flange 108 abutting against elastic wedging element 4, and having a radial extension that rearwardly overlaps the edge delimiting the corresponding slot 106, 106' in locking element 6, causing it to become sealingly clamped against elastic wedging element 4. Tubular shells 8 further include an annular outer abutment at the area where each flange of projection sleeve 504 is disposed. Thus, flanges 108 are sealingly clamped between the ring nut, i.e. locking element 6 and wedging element 4.

As shown in FIGS. 6 to 8, in the illustrated embodiment shells 8 are composed of tube stubs that at one end are provided with an outer perimetric flange 108. Such flange 108 does not need to be continuous, but can also be discontinuous. In this embodiment, projection sleeves 504 are outwardly protected. Moreover, depending on the stiffness of tubular shells 8, a support element supporting for the pipe is created, which is transversally and adjustably flexible in the transverse direction because it is composed of two elements that can be elastically deformed to bend. Each of these two elements may have different deformation properties.

Moreover, having rims of a length progressively increasing toward the ends of projection sleeves 504 opposite to elastic wedging element 4 causes each projection sleeve 504 to have limited bending movements that are elastically damped inside the corresponding shell 8. Therefore, the pipe can slightly bent toward the end of sleeve 504 that is farthest from bulkhead 1, where the pipe is locked in a fixed position. Upon the increase in deformation of the pipe that is bent or deflected, such deformation is guided and supported by the combination of elastic bending strengths of projection sleeve 504 and of shell 8 enclosing it.

According to an embodiment of the invention, projection sleeves 504 of elastic wedging element 4 are made of an elastic material, while shells 8 also are made of an elastic material that is less flexible or more rigid than the material of projection sleeves 504. In one embodiment, projection sleeves 504 are made of the same material of wedging element 4.

Due to the above described mechanical configuration, the combination of outer shell 8 and projection sleeve 504 also provides an effective cushioning/damping system for the vibrations that occur along the pipe and that could stress the pipe material in the area clamped into the wedging element within the thickness of the wall.

It should be noted that like elastic wedging element 4, projection sleeves 504 also may be made of two halves according to the same transverse plane separating the elastic wedging element 4, that is, the plane including the axes of adjacent openings 204, 204' of the elastic wedging element 4. This plane also contains the axes of projection sleeves 504.

In one embodiment, projection sleeves 504 are integral with the elastic wedging element 4, therefore, the assembly of elastic wedging element 4 and of projection sleeves 504 is made of two halves each integrally including one half of elastic wedging element 4 and of two semi-cylindrical projection parts placed side by side. Each such half is a half of the two projection sleeves 504, which are coaxial to openings 204, 204' or to the semi-cylindrical surfaces constituting one half of the wall delimiting openings 204, 204'. This arrangement is shown in FIGS. 9 to 12.

In one embodiment of the invention, the mutually abutting surfaces of the half-shells constituting the two elastic wedging elements 4 and projection sleeves 504 have combinations of protrusions and recesses in the abutment wall of both of the half shells, which facilitate an accurate initial positioning before assembling shells 8. Moreover, elastic wedging element 4 may have lightening recesses or notches, preferably extending in the axial direction and in the thickness of the wall surrounding openings 204, 204'.

In still another embodiment, such recesses are disposed at the end side of the elastic wedging element 4 that is opposite to projection sleeves 504 and exhibit a crown-like arrangement along a circular line surrounding the corresponding openings 204, 204'. In one variant of this embodiment, two circular crown-shaped recesses 804 can be provided, each surrounding one of the two openings 204, 204'. In another variant, the two openings 204, 204' are so close to each other that the line of the arrangement of said lightening recesses 804 is a line surrounding both said openings 204, 204'. Within openings 204, 204', one or more conical flares 603 may be provided to facilitate introduction of pipes 2, 2'.

While the invention has been described in connection with a number of embodiments, it is not intended to limit the scope of the invention to the particular forms set forth, but on the contrary, it is intended to cover such alternatives, modifications, and equivalents as may be included within the scope of the invention. For example, each of the embodiments described herein is not intended to limit the scope of the invention because only two passage openings for only two pipes have been described. On the contrary, a guide element constructed according to the principles of the present invention is easily understood by a person skilled in the art to be configurable to support three or more pipes.

What is claimed is:

1. A guide element for the passage of one or more tubular elements through a wall comprising:
   an interposition element configured to be fit between the one or more tubular elements and an edge of an aperture in the wall, the interposition element comprising a separate elastic urging element shaped to be urged between the one or more tubular elements and the edge of the aperture; and
   a clamping flange configured to be disposed on a side of the wall concentrically with the aperture, the clamping flange comprising an annular perimetric strip surrounding the aperture and fastenable to the wall, the clamping flange clamping the interposition element in an urged condition while allowing the one or more tubular elements to pass through the aperture,
   wherein the interposition element comprises a first part having a perimetric shape complementary to the shape of the aperture and a second part configured to be urged between the one or more tubular elements and the first part, the second part providing the elastic urging element, and wherein the first part of the interposition element comprises a cup-shaped bell having a bottom wall provided with one or more openings allowing the passage of the one or more tubular elements, the bell extending longitudinally to house, at least partially, the elastic urging element.

2. The guide element of claim 1, wherein the interposition element has a perimetric shape complementary to the edge of the aperture.

3. The guide element of claim 1, wherein the aperture comprises one or more pairs of adjacent openings.

4. The guide element of claim 1, wherein the aperture is composed of a single opening.

5. The guide element of claim 1, wherein a longitudinal extension of the bell is equal to or greater than a thickness of the wall, and wherein the bell comprises a peripheral abutment portion overlapping a periphery of the aperture in an assembled condition.

6. The guide element of claim 1, wherein each of the one or more openings in the wall of the bell has a diameter larger than one of the one or more tubular elements passing therethrough, the elastic urging element providing a seal between the one or more tubular elements and the bell.

7. The guide element of claim 1, wherein the elastic urging element comprises two complementary halves providing a seal between the one or more openings in the bottom wall of the bell and the aperture in the wall.

8. The guide element of claim 7, wherein the two halves of the elastic urging element comprise inner surfaces surrounding the one or more tubular elements and having different inner diameters forming a longitudinal step, whereby the longitudinal step increases an effectiveness of the seal.

9. The guide element of claim 8, wherein the two halves are made of a rubber material.

10. The guide element of claim 1, wherein the elastic urging element has a longitudinal extension larger than a longitudinal extension of the bell, whereby the elastic urging element is caused to expand laterally when longitudinally compressed by the clamping flange, improving a sealing effect.

11. The guide element of claim 1, wherein the clamping flange includes one or more openings longitudinally aligned with the one or more openings in the bell, the one or more openings in the clamping flange having a perimetric edge abutting against the elastic urging element.

12. The guide element of claim 11, wherein the one or more openings in the clamping flange each have a diameter greater than one of the one or more tubular elements passing therethrough, the elastic urging element providing a seal between the one or more tubular elements and the clamping flange.

13. The guide element of claim 1, wherein the clamping flange includes openings for coupling by inserting fasteners.

14. The guide element of claim 1, further comprising an annular perimetric seal placeable between the clamping flange and the wall.

15. The guide element of claim 1, wherein there are two clamping flanges placeable on opposite sides of the wall.

16. The guide element of claim 1, wherein the wall is a ship bulkhead, and wherein the tubular elements are oil supply pipes within a circuit for driving a steering cylinder.

17. The guide element of claim 1, wherein the elastic urging element is shaped as one or more bushings made of an elastic material, each of the one or more bushings being coaxially aligned with one of the one or more openings in the bell and extending longitudinally more than a depth of a cavity in the bell, each of the one or more bushings having an inner surface with at least a portion thereof that is radially narrower than another portion thereof or to an end thereof.

18. The guide element of claim 17, wherein the at least a portion thereof that narrows radially is connected to the another portion thereof or to the end thereof by a conical flare.

19. The guide element of claim 1, wherein a crown of recesses is provided at an end portion of the elastic urging element that faces the bell, the recesses extending longitudinally along at least a portion of an inner surface of the elastic urging element.

20. The guide element of claim 19, wherein the recesses are shaped and sized to produce a predetermined elastic behavior of the elastic wedging element during radial compression between the bell and the one or more tubular elements upon locking the clamping flange against the wall.

21. The guide element of claim 1, wherein the bell has a perimetric flange overlapping or abutting against a wall strip surrounding the aperture in the wall, further comprising an interposition seal placeable between the perimetric flange and the wall strip, whereby the interposition seal is configured to be clamped between the perimetric flange and the bell.

22. The guide element of claim 1, wherein the elastic urging element comprises one or more elastic projection sleeves extending longitudinally in a direction opposite to the bell and coaxially with the one or more openings of the elastic urging element and of the bell, the projection sleeves overlapping portions of the one or more tubular elements locked into the interposition element.

23. The guide element of claim 22, the there is a plurality of the projection sleeves one separate from the other.

24. The guide element of claim 22, wherein each one of the one or more projection sleeves includes a perimetric shell wall that is knurled or has rims.

25. The guide element of claim 24, wherein the one or more projection sleeves have shell walls of substantially uniform thickness, wherein the shell walls are partially composed of annular and radial rims longitudinally disposed side by side and having radial extension that are largest farthest from the wall and that progressively decrease to substantially zero in the proximity of the bell.

26. The guide element of claim 22, wherein the one or more projection sleeves have uniform outer diameters and have shell walls with a thickness progressively narrowing from an end adjacent to the bell toward an opposite end.

27. The guide element of claim 22, wherein each of one or more the projection sleeves is housed into an outer tubular shell having an inner diameter substantially equal to an outer diameter of the one or more projection sleeves, the outer tubular shell comprising an end flange abutting against the elastic urging element and overlapped by the clamping flange, whereby, when the clamping flange is clamped against the wall and the interposition element, portions of the tubular shells are contemporaneously engaged between the clamping flange and the interposition element.

28. The guide element of claim 27, wherein the outer tubular shell comprises a tube stub provided at one end with a continuous or discontinuous perimetric flange.

29. The guide element of claim 27, wherein the one or more projection sleeves are made of an material having a first predetermined level of elasticity while the one or more tubular shells are made of a material having a second predetermined level of elasticity.

30. The guide element of claim 29, wherein the first level of elasticity is close or equal to a level of elasticity of the elastic urging element, and wherein the second level of elasticity is lower than the first level of elasticity.

31. The guide element of claim 27, wherein the one or more projection sleeves and the one or more tubular shells are made of two halves separated along a diametral plane.

32. The guide element of one or more of the preceding claims 27, wherein there are two projection sleeves integrally made with the elastic urging element in a single assembly, the single assembly comprising two halves each including one half of the elastic urging element and two semicylindrical projecting portions placed side by side.

33. The guide element of claim 27, wherein each of the one or more projection sleeves is made of two half shells separated along a diametral plane, an outer tubular shell retaining the two half shells in a coupled condition by fitting over the two half shells, an outer diameter of each projection sleeve being substantially equal to an inner diameter of the corresponding outer tubular shell.

34. The guide element of claim 33, wherein two or more outer tubular shells are integrated into a single element.

35. The guide element of claim 33, wherein inner diameters of the one or more projection sleeves are substantially equal to outer diameters of the portion of the one or more tubular elements to be housed inside the one or more projection sleeves and are smaller than outer diameters of terminal portions of the one or more tubular elements, and wherein the outer diameters of the one or more projection sleeves and the inner diameters of the outer tubular shells are substantially equal and larger than the outer diameters of the portions of the one or more tubular elements to be housed into the one or more projection sleeves and the outer diameter of the terminal portions of the one or more tubular elements.

* * * * *